United States Patent [19]

Johnson

[11] Patent Number: 5,259,026
[45] Date of Patent: Nov. 2, 1993

[54] METHOD FOR SPEED CALLING AUTOMATIC UPDATE

[75] Inventor: Carl E. Johnson, Colts Neck, N.J.

[73] Assignee: Bell Communications Research, Inc., Livingston, N.J.

[21] Appl. No.: 809,923

[22] Filed: Dec. 18, 1991

[51] Int. Cl.$^5$ .......................... H04M 3/42; H04M 1/26
[52] U.S. Cl. ...................................... 379/207; 379/88; 379/213; 379/216
[58] Field of Search ................ 379/207, 216, 213, 221, 379/220, 201, 88

[56] References Cited

U.S. PATENT DOCUMENTS

| | | | |
|---|---|---|---|
| 4,284,852 | 8/1981 | Szyloicki et al. ................ | 379/221 |
| 4,310,727 | 1/1982 | Lawser ................................ | 379/207 |
| 4,811,388 | 3/1989 | Westerhof et al. ................ | 379/229 |
| 5,014,262 | 5/1991 | Harshavardhana ................ | 370/16 |
| 5,052,038 | 9/1991 | Shepard ............................. | 379/88 |

OTHER PUBLICATIONS

"Advanced Intelligent Network Release 1 Network and Operations Plan" SR-NPL-001623, Issue 1, Jun. 1990, Bell Communications Research, Inc.

"Common Channel Signaling 7 Information Guide", 256-002-100, Issue 2, Jun. 1988, AT&T Network Systems.

"Chapter T1.113.1 Functional Description of the Integrated Services Digital Network (ISDN) User Part", Letter Ballot Version of American National Standards Institute (ANSI), Version 91/03, Mar. 1991.

*Primary Examiner*—Thomas W. Brown
*Attorney, Agent, or Firm*—Leonard Charles Suchyta; Loria B. Yeadon

[57] ABSTRACT

A method for automatically updating a speed calling data base in a telecommunications network entails tagging an outgoing speed call with a speed calling tag, identifying the telephone number of a speed call as being non-working, retrieving the updated telephone number, and replacing the non-working number in the speed calling data base with the updated number based on update options selected by the calling party. All occurrences of the non-working number could be replaced depending upon options selected by subscribers being served from the speed calling data base.

12 Claims, 10 Drawing Sheets

METHOD FOR SPEED CALLING AUTOMATIC UPDATE

FIELD OF INVENTION

The present invention relates to a method implementable in a telecommunications network, and more specifically, to a method for automatically updating a network data base, particularly, a speed calling data base.

BACKGROUND OF THE INVENTION

Speed calling, a service offered by many local exchange carriers, has great appeal to telephone users who frequently call the same telephone number. Upon subscribing to the speed calling service, a subscriber is designated a portion (typically, for 9-31 numbers) of the speed calling data base which serves multiple subscribers within a serving area. The subscriber can utilize his portion of the database for storing telephone numbers and corresponding abbreviated numbers to place a speed call. Once speed calling is activated, by entering a telephone number with its associated abbreviated number in the speed calling data base, future calls to this telephone number can be placed by simply dialing the abbreviated number.

The most appealing advantages of subscribing to speed calling are convenience and efficiency. Speed calling can allow a subscriber to call a telephone number by entering (by dialing, by speaking the name of the calling party, etc.) the abbreviated number which usually has significantly fewer digits (typically, two or three) than the actual telephone number (typically, seven to eleven digits). This service is also desirable because the caller is relieved from having to remember or routinely look up frequently called numbers. Furthermore, important numbers, which may not necessarily be frequently dialed (i.e., emergency numbers, fire department, police, etc.,), can be readily and easily accessed by substituting these numbers with a memorable abbreviated number (i.e., FIRE (3473), COP (267), etc.,) using speed calling.

However, the advantages offered to a speed calling subscriber are greatly diminished when the telephone number stored in the speed calling data base changes or goes out of service and thus, is rendered non-working. Once subscribers have exercised the procedure to populate their speed calling data base with telephone numbers and corresponding abbreviated numbers, they are reluctant to seek out and implement procedures to update a changed telephone number or to delete those numbers permanently out of service. Often subscribers are intimidated by hi-tech methods for implementing services such as speed calling and are apprehensive toward executing related procedures. Many subscribers perceive manual update procedures to be too involved and bothersome to warrant the trouble and anxiety of updating a non-working telephone number.

Over time, a subscriber's failure to execute manual speed calling update procedures leads to a speed calling data base populated with non-working numbers. As a result, the subscriber must resort to using conventional calling methods which entail remembering and dialing all digits of the called telephone number. Clearly, as non-working telephone numbers dominate a subscriber's memory in the speed calling data base, the advantages of speed calling, namely, convenience and efficiency, are significantly degraded such that the cost-benefit ratio does not justify subscribing to the speed calling service.

In view of the severely diminished convenience and efficiency of speed calling service when stored telephone numbers are changed or out of service, an object of my invention is to provide a method for automatically updating a network speed calling data base.

SUMMARY OF THE INVENTION

The method of my invention can be implemented to secure the advantages of speed calling service by automatically updating the speed calling data base. When a subscriber places a call to a non-working or out of service telephone number using speed calling and an updated telephone number is available, the updated number is retrieved and all occurrences of the telephone number in the speed calling data base serving the originating node are automatically updated. After the data base update is completed, the subscriber is informed of the data base update and the updated telephone number and given the option to complete the call to the updated telephone number. Similarly, other speed calling subscribers placing speed calls to the same outdated destination number may also be given the updated number and option to complete the call to the updated telephone number.

If an updated telephone number is unavailable (i.e., updated number unlisted, no forwarding number, etc.,), the call can be treated in a conventional manner, thereby leaving the speed calling data base unaffected. Alternatively, special flags could be set in the speed calling data base to reflect that the telephone number is non-working and that future speed calls invoking this number in the data base should be abandoned to prevent the needless processing of calls to the non-working number, thus saving network facilities.

My method of automatic speed calling update adds a unique and positive dimension to speed calling by alleviating the speed calling subscriber of the hassle and anxiety of updating his speed calling data base each time a stored telephone number changes. Automatic update ensures that the speed calling data base will be kept current, thus preserving its convenience and efficiency and its overall appeal and benefit to subscribers. My inventive method for automatically updating the speed calling data base is efficient since all occurrences of the called telephone number appearing in the speed calling data base can be updated when any subscriber served by the originating node places a speed call to a non-working number. Furthermore, implementation of my invention will save network facilities by flagging non-working speed calling numbers for which no updated number is available, thus preventing the needless processing of the call beyond the originating node.

DETAILED DESCRIPTION

My inventive method for providing speed calling automatic update is presented by initially describing illustratively an architectural environment in which to implement the update method, namely, the Advanced Intelligent Network (AIN) environment. Background information on AIN is discussed in Section A. The steps comprising the update method are discussed in Section B by tracing the progression of a speed call under two scenarios:

1. A speed call being placed to a called party served from the same switch as the calling party as described in Section B1; and
2. A speed call being placed to a called party served from a switch different than that of the calling party as described in Section B2. In Section C, options relating to speed calling automatic update which may be provided to the subscriber are described.

A. ADVANCED INTELLIGENT NETWORK (AIN)

Many network architectures supporting speed calling services can gracefully implement my inventive method for speed calling automatic update. For the purpose of a specific illustrative example, the network architecture employed for implementing my inventive method is the the Advanced Intelligent Network (AIN).

The object of AIN is to create a programmable service-independent environment having standard interfaces and being compatible with multi-vendors' equipment such that network service providers can quickly respond to customer needs and market opportunities. Details of AIN are provided in "Advanced Intelligent Network Release 1 Network and Operations Plan", Special Report, SR-NPL-001623, Issue 1, June 1990, published by Bell Communications Research.

Figure 1:
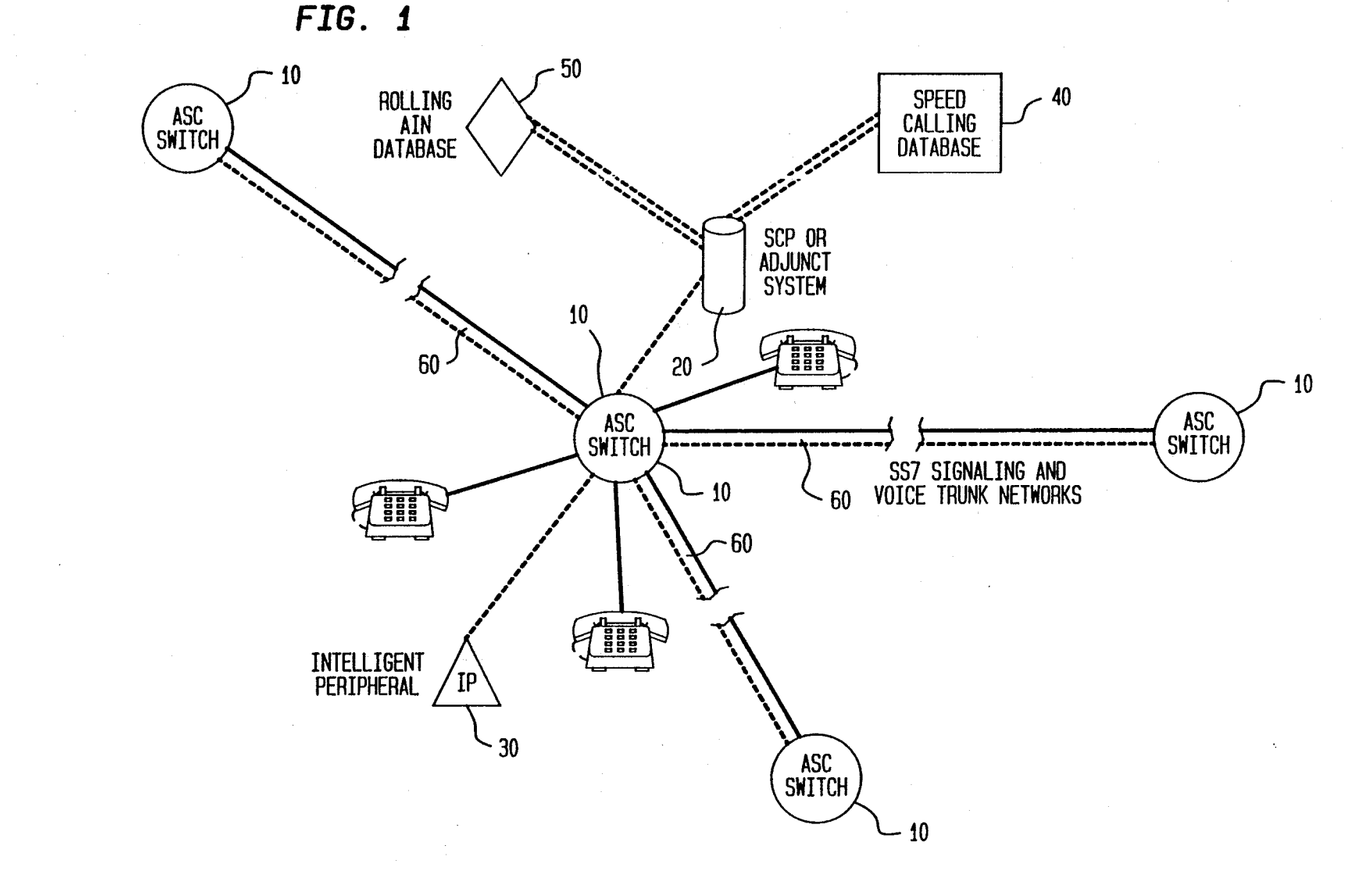
FIG. 1 shows the Advanced Intelligent Network Architecture (AIN) in which my invention may be employed.

As shown in FIG. 1, the elements of the AIN network 100 affected during automatic speed calling update include switch 10 having AIN Switch Capabilities called the ASC switch 10, a Service Control Point (SCP) or Adjunct System 20, an Intelligent Peripheral (IP) 30, a speed calling data base 40, and a rolling AIN data base 50. The AIN network 100 is comprised of multiple ASC switches interconnected by voice trunk and signaling networks 60. As shown, signaling communication between ASC switches is provided by Signaling System Number 7 (SS7), a protocol and network for exchanging signaling information between nodes over data links that can be separate from voice paths. For more information on SS7 and similar networks, see *Common Channel Signaling 7 Information Guide*, 256-002-100, AT&T Network Systems, Issue 2, June 1988.

The ASC switch 10 is a hub of the AIN architecture and may be any Stored Program Control (SPC) switching system containing ASC functionality. ASC functionality enables the switch to detect calls warranting AIN service processing involving the exchange of information with the SCP 20, and the IP 30, before resuming normal call processing when service processing is completed.

The ASC switch 10 identifies calls requiring service logic to be executed in order to be routed and processed and initiates dialogue with the SCP or Adjunct System 20 which contains service logic programs (SLPs). Upon receiving instructions resulting from the execution of an SLP 25 at the SCP or Adjunct system 20, the ASC switch 10 responds to the instructions and processes the call accordingly.

The SCP or Adjunct System 20 is the "smart node" in the AIN network containing service logic for processing calls. The SCP 20 communicates with the ASC switch 10 via the SS7 network, which is described above. In lieu of an SCP 20, an Adjunct System could be employed which is functionally equivalent to an SCP 20, but which, does not require SS7 to communicate with the ASC switch 10. Instead, a high speed interface can be used to support communication between the ASC switch 10 and the Adjunct System. For purposes of discussion and illustration herein, an SCP 20 is employed in the AIN network 100 in lieu of an Adjunct System.

Another element of the AIN network 100, which is connected to the ASC switch 10, is the Intelligent Peripheral (IP) 30. The IP 30 can serve as a resource to the switch in many different capacities by providing functions such as collection of Dial Tone Multi-Frequency (DTMF) digits, playing network announcements, and voice recognition. For the purposes of this discussion, the IP 30 provides customized voice announcements. For example, the IP 30 may be accessed via the ASC switch 10 when a voice announcement is to be played for the calling party informing him that the telephone number of the called party is no longer in service.

Also included in the AIN network 100 are the speed calling data base 40 and the rolling AIN data base 50. The speed calling data base 40 stores actual telephone numbers represented by abbreviated numbers that are pre-selected and entered by speed calling subscribers. Each subscriber is designated a portion of the speed calling database for storing his telephone numbers and corresponding abbreviated numbers. The actual telephone number of the called party is retrieved from the speed calling data base and passed to the SCP 20 based upon instructions resulting from execution of a service logic program.

The rolling AIN data base 50 contains recently changed numbers (outdated numbers with their corresponding updated numbers). This data base could be established internal to the SCP 20 and queried when the incoming call is a speed call and the telephone number of the called party is identified at the ASC switch 10 as being non-working or out of service.

Both the speed calling and the rolling AIN databases 40 and 50 could reside internal or external to the SCP 20. If these databases reside externally, the SCP 20 may require additional capabilities to make external queries. External rolling data base capabilities could be provided using the intercept data base, which is a conventional network data base that contains recently changed numbers. For illustrative purposes, the speed calling and rolling AIN data bases 40 and 50 are assumed to be internal to the SCP 20. However, for the ease of discussion, these databases are logically shown in FIGS. 1, 2 and 4 as network components distinct from the SCP 20.

In general, the SCP 20 may serve a single or several ASC switches within a cluster of network switches. Furthermore, the SCP 20 may have access to a single or multiple speed calling and rolling AIN databases located internally or externally. For illustrative purposes, the SCP is shown to serve a single ASC switch 10, and each SCP is shown to have access to a single speed calling data base 40 and a single rolling AIN data base 50.

B. STEPS FOR IMPLEMENTING SPEED CALLING AUTOMATIC UPDATE

Figure 2:
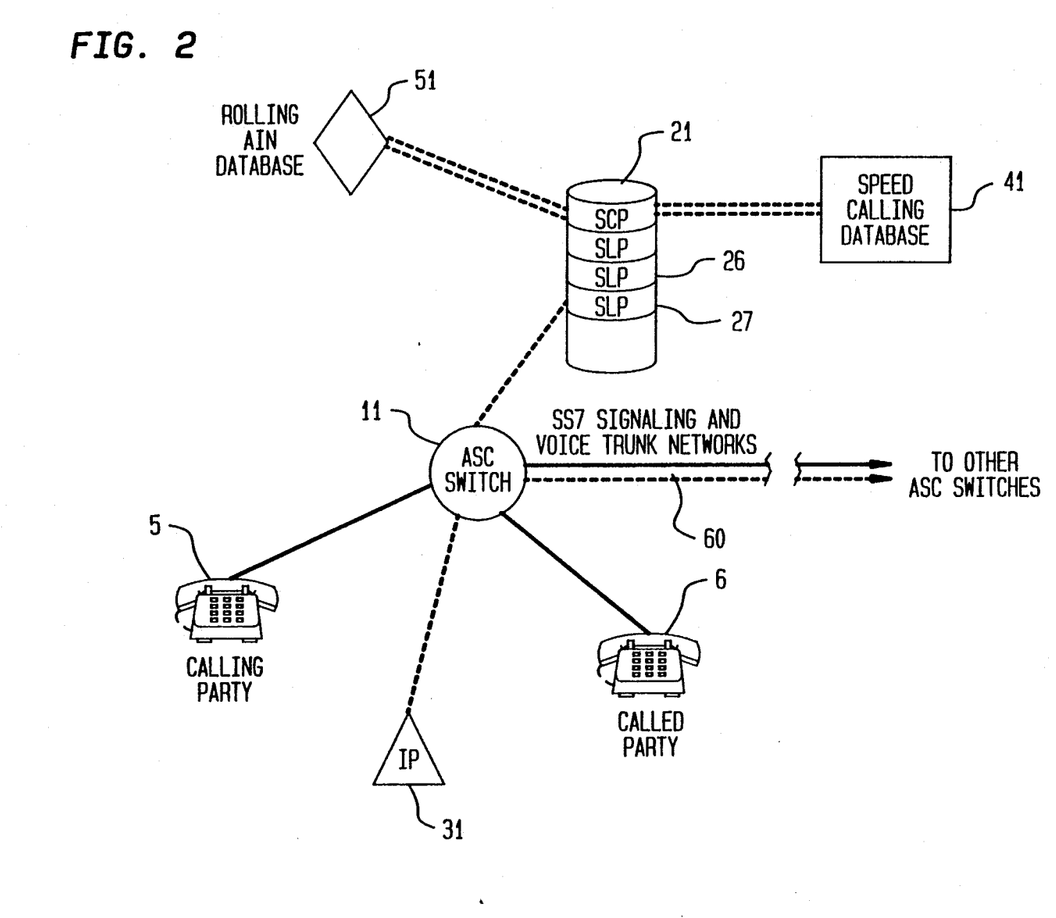
FIG. 2 depicts elements of the AIN network involved in speed calling automatic update in accordance with an aspect of the present invention where the calling and called parties are served by the same ASC switch.
Figure 3A:
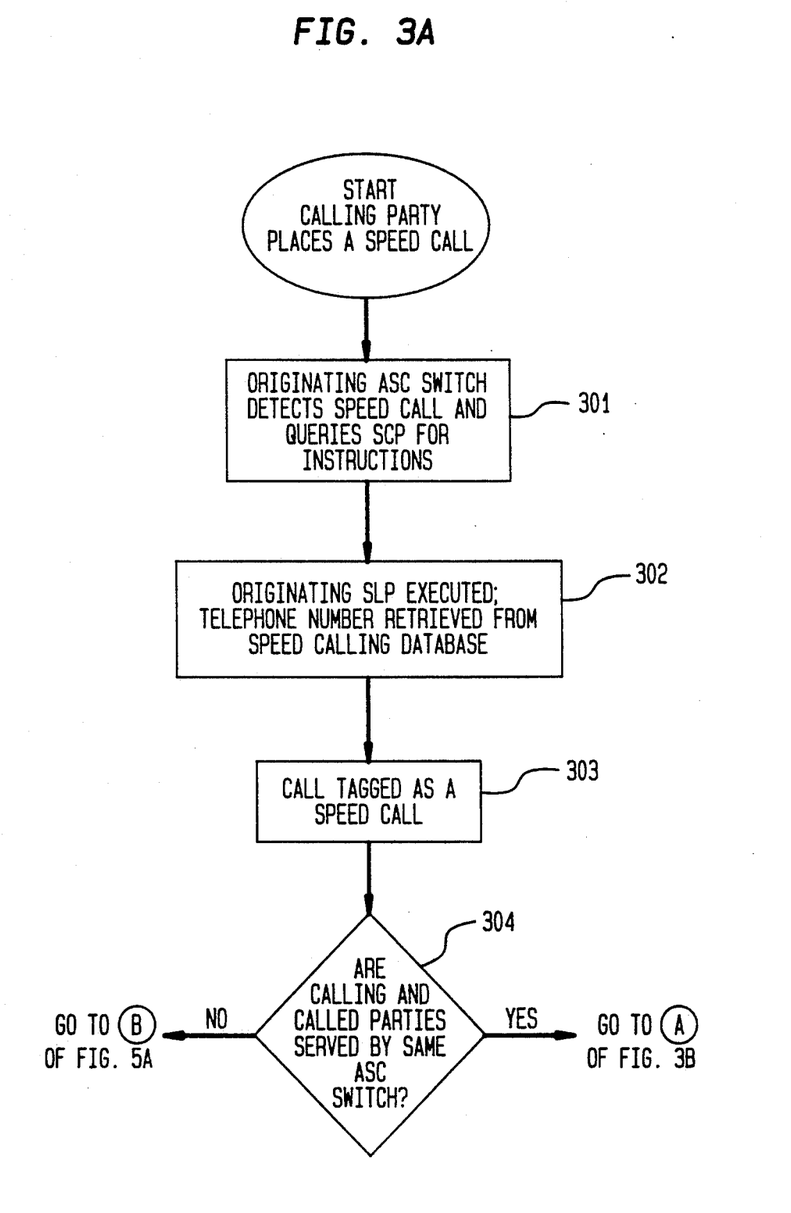
FIG. 3A is a flow diagram in accordance with my invention depicting the steps for performing speed calling automatic update.
Figure 3B:
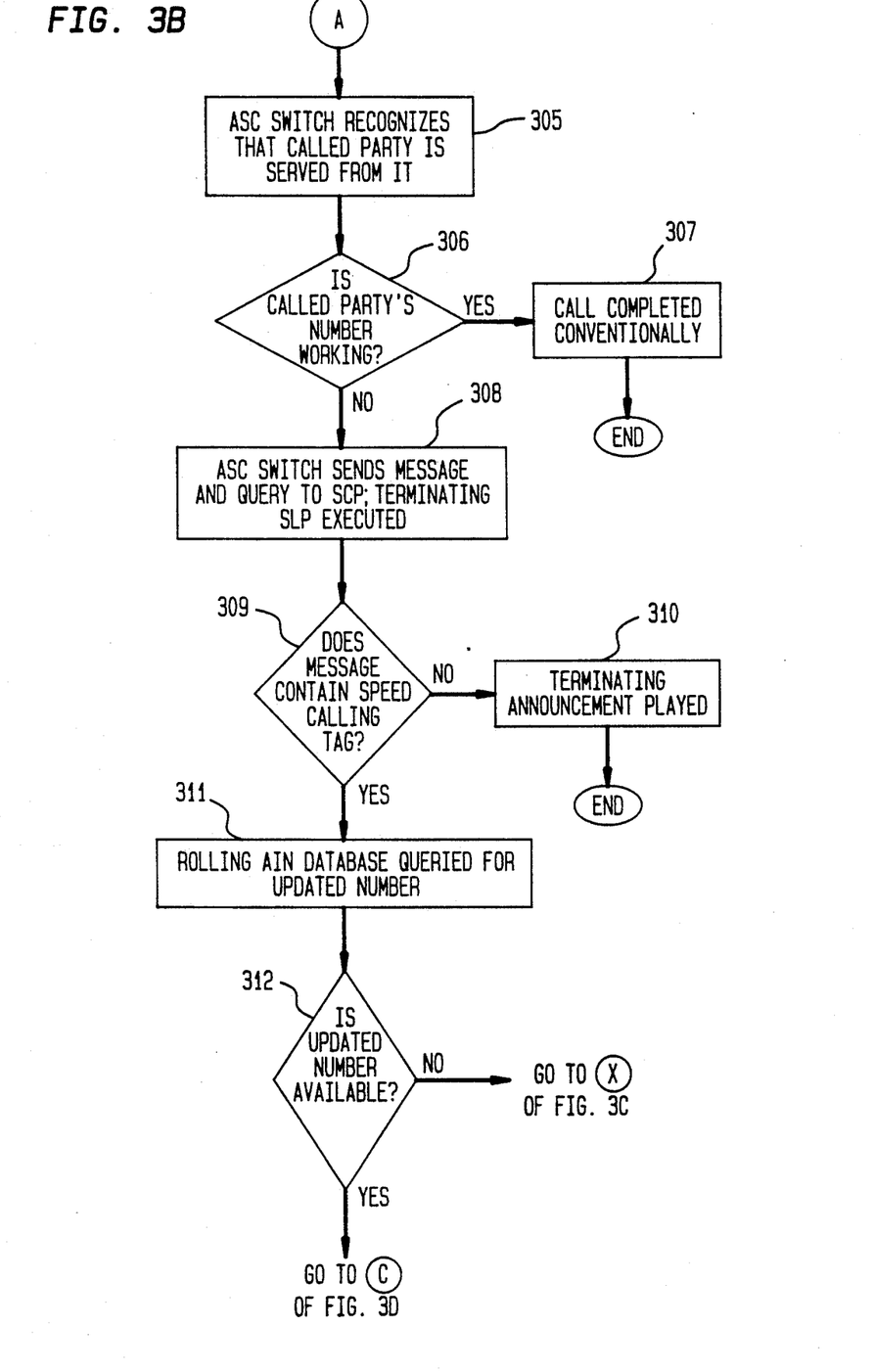
FIGS. 3B, 3C, and 3D are flow diagrams in accordance with one embodiment of my invention and depicting the steps for performing speed calling automatic update when the calling and called parties are served by the same ASC switch.
Figure 3C:
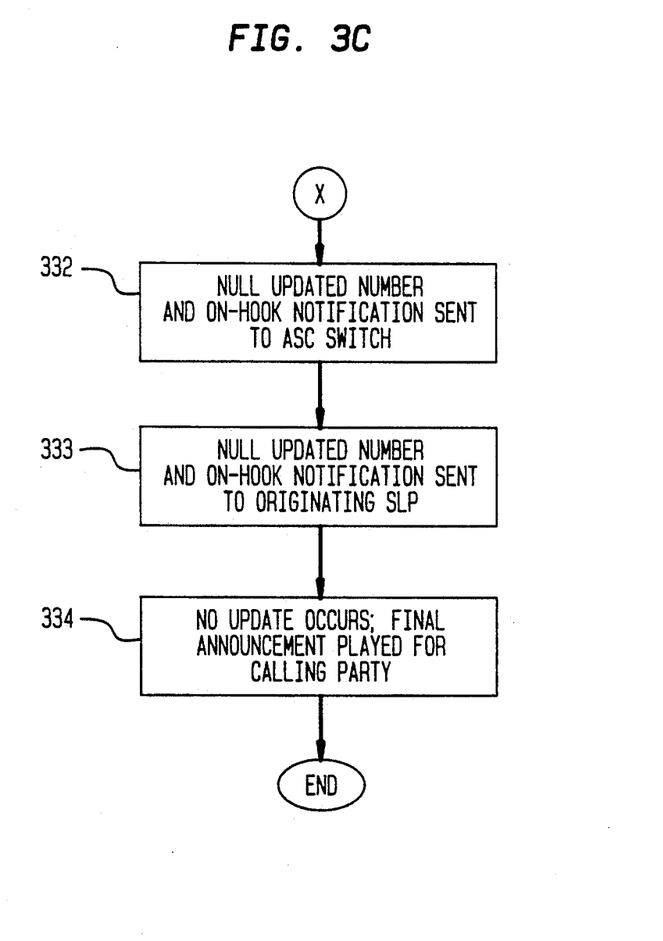
Figure 3D:
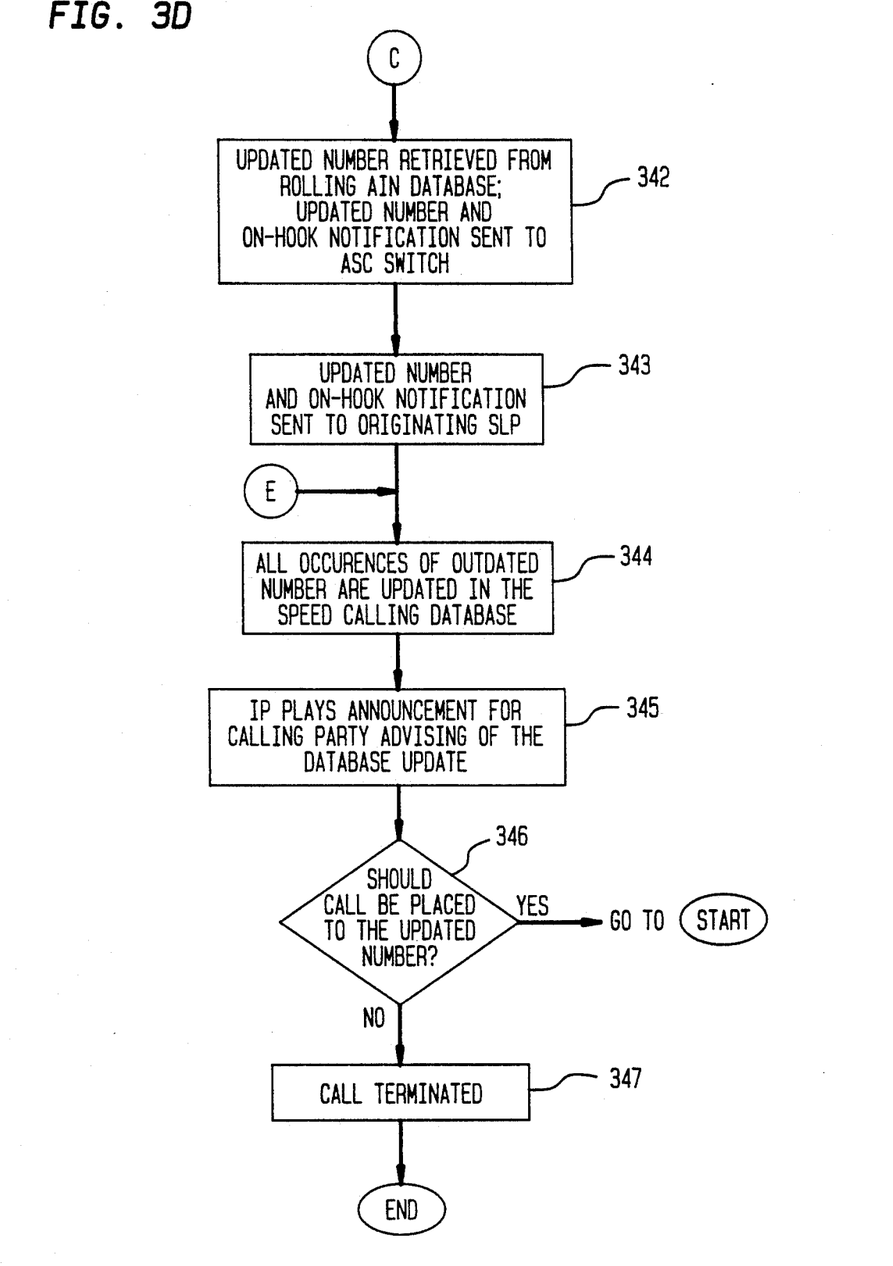
Figure 4:
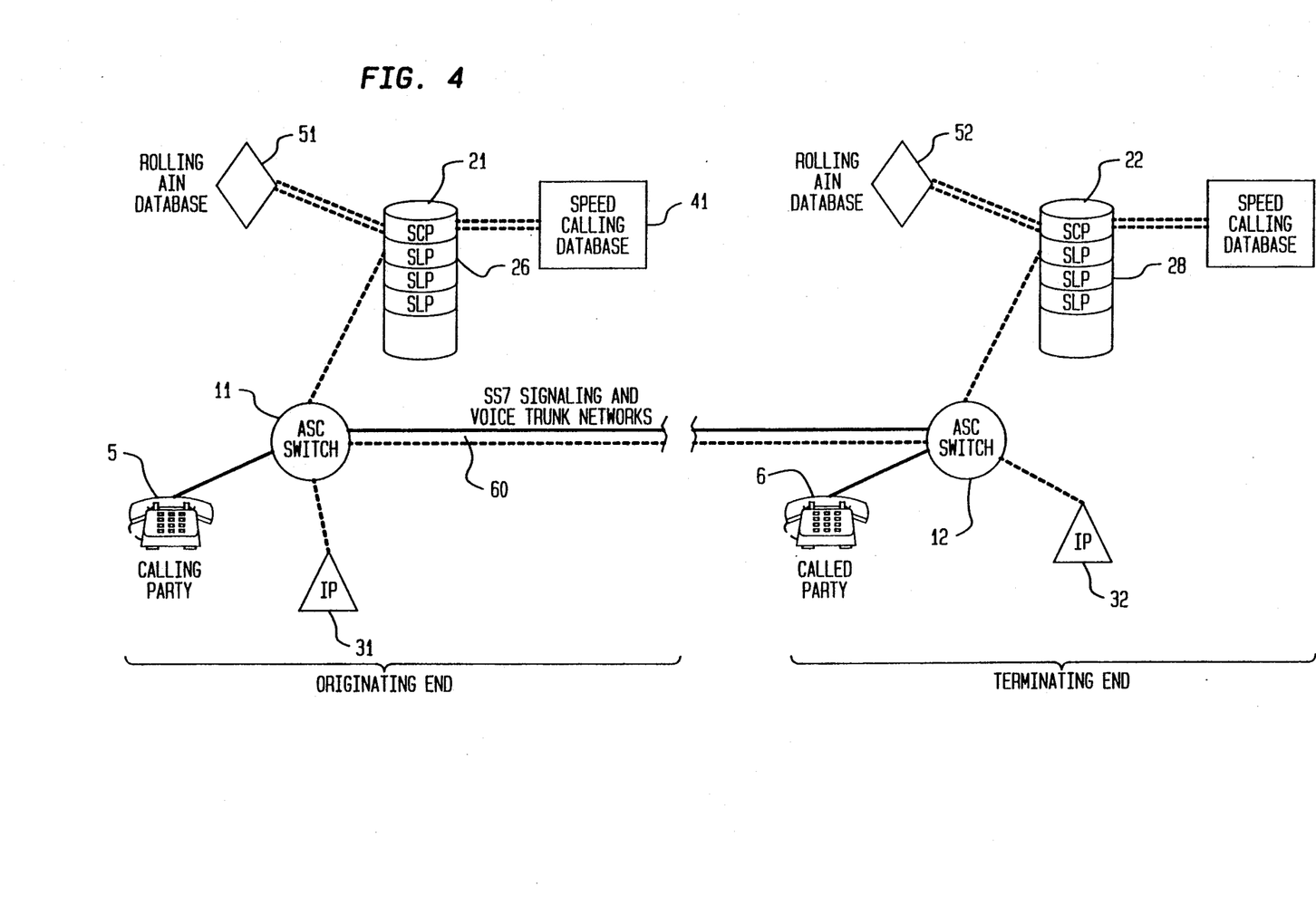
FIG. 4 depicts AIN network elements involved in speed calling automatic update in accordance with an aspect of the present invention where the calling and called parties are served by different ASC switches.

The steps for implementing speed calling automatic update are illustrated in FIGS. 2 and 4 and in the flow diagrams of FIGS. 3A through 3D and FIGS. 5A through 5C. Once speed calling service has been enabled by the service provider and activated by the subscriber, speed calls can be placed. To place a speed call, the calling party 5 must enter the abbreviated number (such as 4*) representing the telephone number of the called party 6. This abbreviated number is received at the originating ASC switch 11. As denoted in flow diagram element 301 of FIG. 3A, the originating ASC switch 11 detects that the abbreviated number is for a speed call and queries the originating SCP 21 for a service logic program (SLP) 26 to generate instructions and information to route and process the outgoing speed call. This SLP 26, which provides routing and processing instructions for an outgoing call, is known as the originating SLP 26.

At the originating SCP 21, per instructions from the originating SLP 26, the actual telephone number of the called party is retrieved from the speed calling data base 41, which stores entries previously programmed by the subscriber, to be used by the originating ASC switch 11 for routing the call, element 302. Additionally, the originating SCP 21 prepares instructions for the originating ASC switch 11 to place a special tag on the outgoing call, namely, a speed calling service tag, to identify the call as a speed call, element 303.

This tag could be provided at the orginating ASC switch 11 for transmittal in the SS7 ISDN User Part (ISUP) signaling associated with the outgoing call to the terminating switch. SS7 ISUP is the call control part of SS7 protocol that determines the procedures for setting up, coordinating, and disconnecting trunk calls. SS7 ISUP is comprised of a limited set of basic messages, along with many parameters and their elements. Current capabilities of SS7 ISUP are contained in *Chapter T1.113.1 Functional Description of the Integrated Services Digital Network (ISDN) User Part*, Letter Ballot Version of American National Standards Institute (ANSI), Version 91/03, March 1991.

SS7 ISUP messages and parameters can be used in my invention to carry the necessary information between ASC switches for updating the speed calling data base during call setup. In SS7 ISUP, an Initial Address Message (IAM) is initially sent between switches to set-up a call. Within this message, a Service Activation Parameter can be carried which is an optional parameter designated in the SS7 protocol for service identification, and this parameter could be utilized to tag the call as a speed call.

Upon retrieving the telephone number of the called party and other processing and routing instructions through execution of the originating SLP 26, this information is passed from the originating SCP 21 to the originating ASC switch 11 with a request that the originating ASC switch 11 notify the originating SLP 26 of a release (REL) message sent back from the destination ASC switch or an on-hook notification pertaining to the call. The abbreviated number entered to invoke the speed call and the telephone number retrieved from the speed calling data base are noted at the SLP 26 for use in updating the speed calling data base, if required.

After tagging the call as a speed call per instructions from the originating SCP 21, element 303, the call is routed based upon the telephone number of the called party to the terminating ASC switch. The progression of the call at this stage is dependent upon whether the called party is terminated at the same ASC switch as the calling party or at a different ASC switch, element 304. These two scenarios are discussed independently below.

B1. SPEED CALLING CALL BETWEEN PARTIES AT THE SAME ASC SWITCH

After routing and processing information is received from the originating SCP 21, the originating ASC switch 11 queries, flow diagram element 304, and then recognizes that the routing address is that of a party served directly from the originating ASC switch 11, element 305 of FIG. 3B. When a speed call is directed to a called party served by the same ASC switch as the calling party, as shown in FIG. 2, then the originating and destination ASCs switches are one and the same, and therefore will be referred to as simply the ASC switch 11. Likewise, for the sake of discussion, the originating and destination SCPs are one in the same, and will be referred to as the SCP 21. However, an ASC switch could query different SCPs for originating and terminating SLPs.

Under this scenario, the ASC switch 11 determines whether the telephone number of the called party (which was retrieved from the speed calling data base) is a working number, element 306. If the number is working, then the call is processed in a conventional manner, element 307. However, if the telephone number is identified as a non-working number, the ASC switch 11 sends a message to the SCP 21 requesting processing instructions, identifying the telephone number of the called party as being out of service and identifying the telephone number as having been the destination of a speed call by its speed calling tag, element 308.

At the SCP 21, another SLP called the terminating SLP 27 is executed, and a determination is made as to whether the call is a speed calling call, element 309. If the incoming call to the non-working destination number is not tagged as a speed call, the terminating SLP 27 will cause the call to be treated conventionally which may entail playing of a final announcement, element 310. However, upon detecting the speed calling tag, the terminating SLP 27 queries the rolling AIN data base 51 for an updated number, element 311.

An updated number may be unavailable for many reasons such as, the phone number is only temporarily out of service, the updated number is non-published, or no updated number was provided by the called party. If, upon querying the rolling data base, it is determined that an updated number is unavailable, element 312, no updated number is retrieved and a message containing a null updated number is sent from the SLP 27 at the SCP 21 to the ASC switch 11 with instructions to cause an on-hook notification to occur, element 332 of FIG. 3C. Since the originating SLP 26 requested that the ASC switch 11 notify it of an on-hook notification, a message, triggered by the on-hook notification, is sent from the ASC switch 11 to the SLP 26 at SCP 21 with the null updated number. The existence of a null updated number then results in no updating of the speed calling data base, and instruction to be sent to the IP 31, via the ASC switch 11, to have the IP 31 play a final special announcement to the calling party saying that the number is not in service and no updated number is available to update the subscriber's speed calling data base, element 334. The call is then terminated.

If an updated number for the called party is available, the SCP 21 through execution of the terminating SLP 27 retrieves the updated number from the rolling AIN data base 51 and sends a message containing the updated number to the ASC switch 11 with instructions to cause an on-hook notification to occur, element 342 of FIG. 3D. Since the originating SLP 26 requested the ASC switch 11 to notify it of an on-hook notification, a message, triggered by the on-hook notification, is sent from the ASC switch 11 to the SLP 26 with the updated number, element 343.

Upon receiving the message containing the updated number, the originating SLP 26 checks for an updated number (not a null updated number). Upon detecting an updated number, the originating SLP 26 causes the speed calling data base 41 to be searched and for all occurrences of the outdated number in the speed calling data base 41 to be replaced by the updated number, element 344. Additionally, each of the updates in the speed calling data could be flagged so that upon the first use of the number by another subscriber, the subscriber would receive an announcement containing update notification similar to that received by the calling party as described below.

After the automatic data base update is completed, the SCP 21 instructs the ASC switch 11 to have the IP 31 play an announcement to the calling party, element 345, advising that the called party's number has changed and been updated in the speed calling data base and providing the updated number of the called party. In addition the IP 31 asks, the calling party if a call to the updated number should be placed, element 346. (Enter "Y" for Yes or "N" for No).

The ASC switch 11 collects the Y (Yes) or N (No) response and sends it to the SCP 21. If the calling party responds "Y" (Yes), the SCP retrieves the updated number of the called party from the speed calling data base 41, which is passed to ASC switch 11 along with instructions for routing the call. If the calling party responds "N" (No), the SCP instructs the IP 31 via the ASC switch 11, to play a final announcement and the ASC switch 11 to terminate the call, element 347.

B2. SPEED CALLING CALL BETWEEN PARTIES AT DIFFERENT ASC SWITCHES

Achieving speed calling automatic update when a speed call is placed to a called party served by another ASC switch, is handled in a similar manner as described in Section B1 where the calling and called parties are served from the same ASC switch. Unlike the scenario described in Section B1, however, the originating and destination ASC switches are distinct elements in the AIN network interconnected by voice trunks and SS7 signaling networks 60.

As discussed in Section B1, upon a speed call being initiated, the originating ASC switch 11 accesses the actual telephone number of the called party and other call processing and routing instructions by executing of the originating SLP 26 at the originating SCP 21. The originating ASC switch 11, as illustrated in FIG. 4, then routes the call to the terminating ASC switch 12, which serves the called party via the trunk and signaling networks 60 using SS7 signaling as depicted by element 501 of the flow diagram of FIG. 5A. Upon receiving the speed call and determining that the telephone number is out of service, element 502, the terminating ASC switch 12 queries the terminating SCP 22 with a message containing the telephone number and speed calling tag for instructions to further process the call, element 503.

Figure 5A:
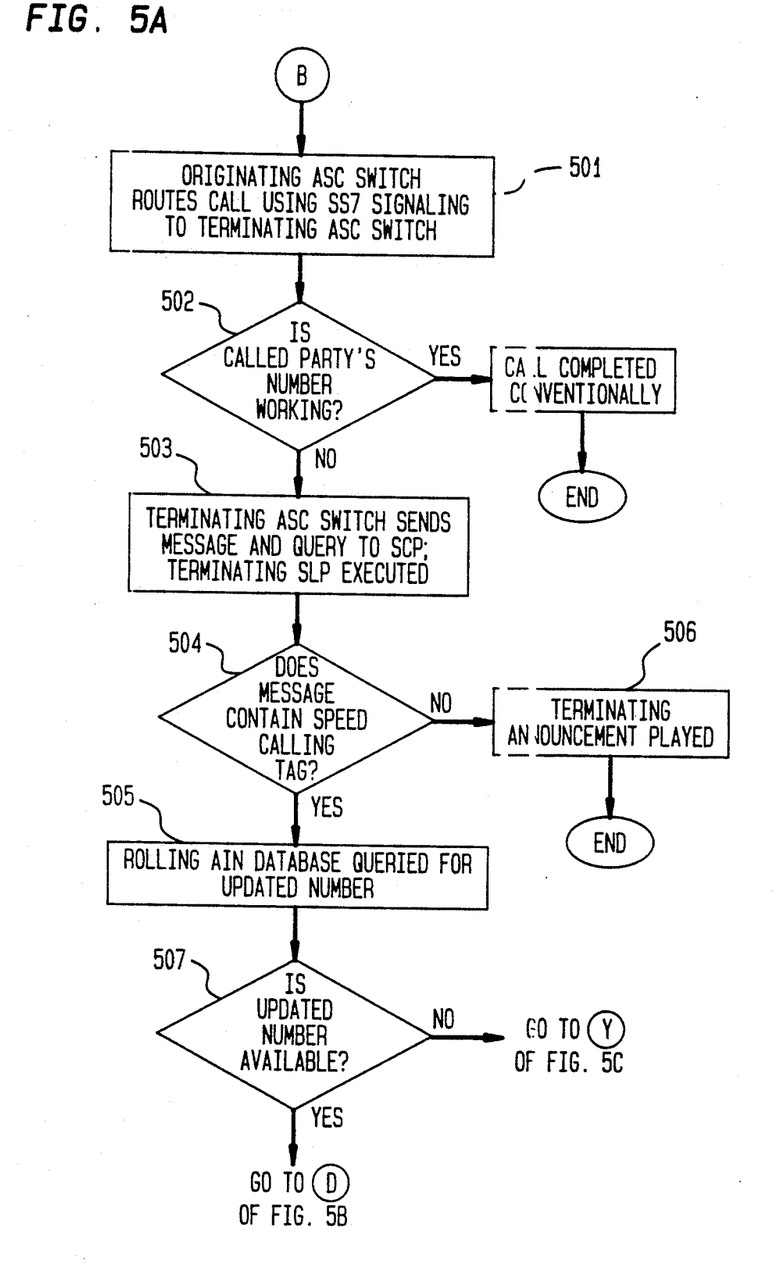
FIGS. 5A, 5B, and 5C are flow diagrams in accordance with an embodiment of my invention and depicting the steps for performing speed calling automatic update when the calling and called parties are served by different ASC switches.

At the terminating SCP 22, another SLP called the terminating SLP 28 is executed. If the incoming call to the non-working destination number is found, element 504, to not be tagged as a speed calling call, the terminating SLP 28 will cause the call to be treated conventionally which may entail playing of a final announcement, element 506. However, upon identifying the call as a speed call by its tag, the rolling AIN data base 52 serving the terminating SCP 22, is queried for the updated telephone number, element 505.

Figure 5B:
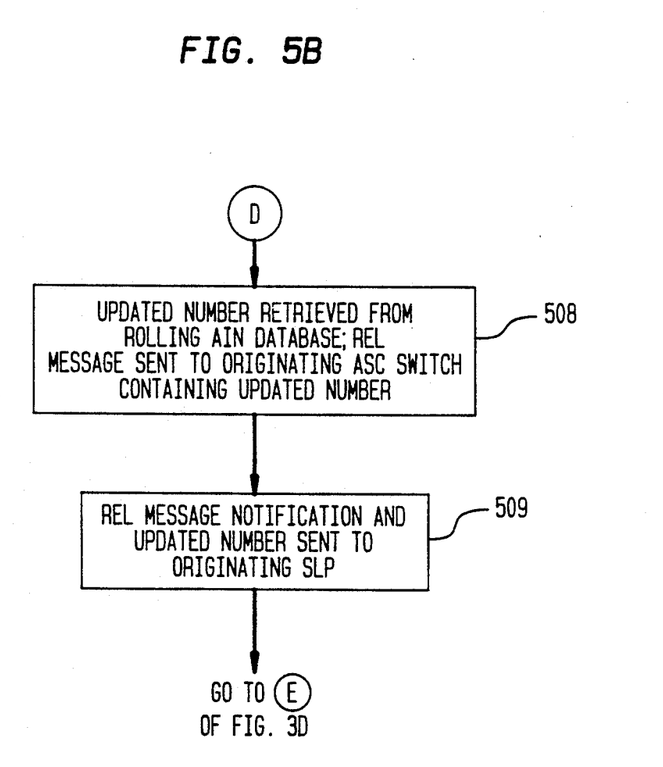
Figure 5C:
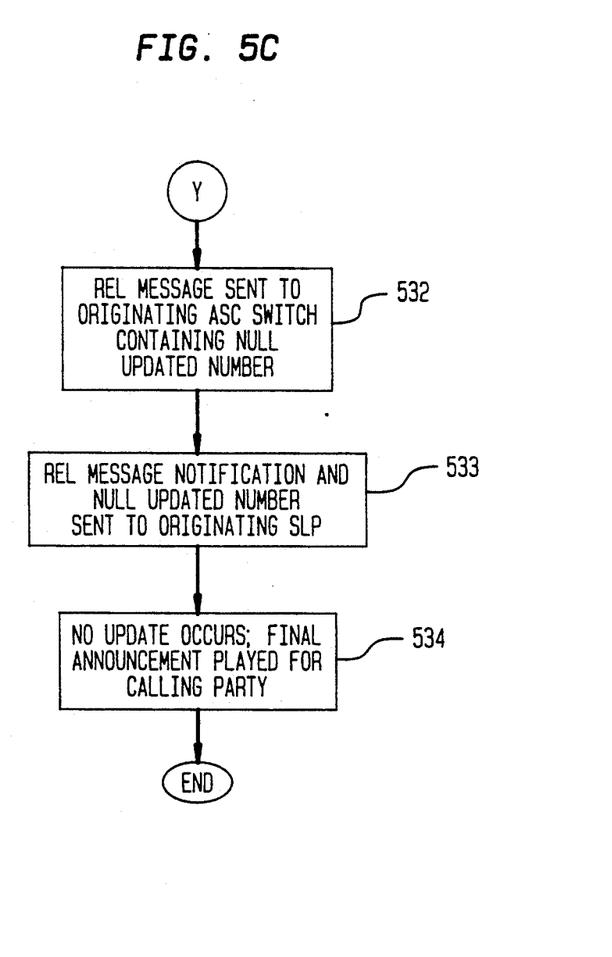

If an updated number is available, element 507, the updated number is retrieved from the rolling AIN data base 52, and the terminating ASC switch 12 is instructed by the terminating SLP 28 to send a release (REL) message to the originating ASC switch 11 containing the updated number for the called party, element 508, FIG. 5B. The REL message is sent from the terminating ASC switch to the originating ASC switch to terminate communications with the originating ASC switch. If no updated number is available from the rolling AIN data base 52, the terminating ASC switch 12 is instructed by the terminating SLP 28 to send a REL message to the originating ASC switch 11 containing a null updated number for the called party, element 532 of FIG. 5C. The updated (or null updated) number could be carried in the REL message in the Cause Indicator Parameter which is a diagnostic parameter used to indicate the reason for terminating communications with the originating ASC switch.

Upon these instructions being followed by the terminating ASC switch 12, the REL message is then transported over the SS7 network to the originating ASC switch. Upon receiving the REL message, the originating ASC switch 11 forwards notification of the REL message and the null updated number or updated number in a message to the originating SLP 26 as requested, element 533 of FIG. 5C or element 509 of FIG. 5B, respectively. If a null updated number is received, the information is then used at the originating SCP 21 to cause a final announcement to be played by the IP saying that the number is not in service and no updated number is available to update the subscriber's speed calling data base, element 534 of FIG. 5C. However, if an updated number is received, all occurrences of the outdated telephone number appearing in the speed calling data base 41 is updated, element 344 of FIG. 3D. The further processing of the call is handled as described in Section B1 and shown in FIG. 3D.

C. ADDITIONAL OPTIONS FOR SPEED CALLING AUTOMATIC UPDATE

As previously discussed in Sections B1 and B2, when a telephone number associated with a speed call is identified as non-working and an updated number is available, all occurrences of the telephone number appearing in the entire speed calling data base serving the originating ASC switch are updated with the updated number.

In some cases, the calling party or other subscribers having separately designated portions of the same speed calling data base may desire more control over the update of their designated portion of the speed calling data base. To give the calling party more flexibility in controlling when outdated numbers are updated, the calling party could be queried prior to his database update being effected. Furthermore, to give other subscribers more flexibility in controlling when outdated numbers should be updated in their portion of speed calling data base, all occurrences of the outdated number could be retained and, flagged with the updated number; therefore, upon the subscriber's next speed call being placed to the outdated number, he will be informed that the number is outdated and queried as to whether the update should be effected. Such a service offering could be called speed calling optional update.

Specifically, to implement this option, the update methods described in Sections B1 and B2 could be modified as follows. Upon receiving a message containing the updated number after the occurrence of an on-hook notification as described in Section B1, or a REL message as described in Section B2, the originating SLP could instruct the originating ASC switch to have the IP play a message which 1) informs the calling party that the telephone number of the called party is outdated; and 2) asks if the outdated number should be updated in the subscriber's speed calling data base. If the calling party responds "no", the outdated number remains unchanged and processing of the call continues. However, if the calling party responds "yes" then the SLP causes the calling party's speed calling data base to be updated and the call continues as described in Sections B1 and B2. In any case, all occurrences of the non-working number are flagged and the updated number noted for subscribers who want the option to control the updating of their data base. All other subscribers will have their non-working numbers automatically updated and flagged so that they are notified the first time the subscriber places a speed call to the outdated number.

A subscriber having speed calling automatic update capabilities may desire the option to have his speed calling data base updated only when he invokes a non-working number from his own speed calling data base, but not when other subscribers invoke the same non-working number in their speed calling data base. This option could also be provided by altering the methods described in Sections B1 and B2. One approach to providing this option would be to limit the speed calling automatic update to not occur throughout the entire speed calling data base, but only at the subscriber's designated portion of the data base. Another approach to providing this option is to update all occurrences of the outdated number in the entire speed calling data base except where subscribers have specifically blocked updates initiated by other subscribers. Instructions for limiting speed calling automatic update according to the subscriber's update option selection could be implemented in the speed calling service logic at the originating SLP.

To save network facilities, other features could be implemented as part of speed calling automatic update. In instances where an updated number is not available to update the speed calling data base, the originating SLP (upon recognizing a null updated number) could cause the non-working number to be specially flagged in the speed calling data base so as to identify the number as non-working. Therefore, in the future when speed calls are placed which invoke this non-working number, this number can be immediately identified by its special flag at the originating SLP as being non-working and the call can be abandoned without querying the terminating end of the network to identify the number as non-working. Implementation of this option prevents future calls to a non-working number in the speed calling data base from being needlessly processed, thus preserving network facilities and resources.

However, the subscriber could be queried to override this special flag such that a call can still be placed to the non-working number upon the subscriber's request. The capability to override this flag may be desired since some non-working numbers are only temporarily out of service and since there could be a delay between a number being taken out of service and an updated number being accessible from the rolling AIN data base.

CONCLUSION

Thus, my invention provides a method for automatically updating a speed calling data base. When a subscriber places a speed calling call to a non-working number and an updated telephone number is available, the updated number is retrieved and the non-working number is automatically replaced in the speed calling data base by the updated number. Therefore, the subscriber's speed calling data base stays current without the subscriber having to manually update the speed calling data base to replace non-working numbers. To maximize savings of network facilities, all occurrences of the non-working number in the speed calling data base are updated unless otherwise requested via specific options selected by speed calling subscribers served at the data base. Numerous alternative embodiments of the present invention may be devised without departure from the spirit and scope of the following claims.

What is claimed is:

1. In a telecommunications network, a method of automatically updating a speed calling data base after speed calling is invoked by a calling party who is served from a node and who dials an abbreviated number, representing a non-working telephone number of a called party served from a node, to place a call to the called party, said method comprising the steps of
retrieving from the speed calling data base the telephone number of the called party corresponding to the abbreviated number dialed by the calling party;
tagging the call with a speed calling identification tag;
upon identifying said retrieved telephone number as non-working, querying a rolling data base for an updated telephone number;
if said updated telephone number is available, retrieving the updated telephone number from said rolling data base;
passing a message comprising said updated telephone number of the called party to the node serving the calling party; and updating the calling party's speed calling data base using information in said message.

2. The method of claim 1, wherein the node serving the calling party and the node serving the called party are the same.

3. The method of claim 1, wherein the node serving the calling party is an originating node, the node serving the called party is a terminating node, and said originating node and said terminating node are different.

4. In a telecommunications network, a method of automatically updating a speed calling data base after speed calling is invoked by a calling party who is served from an originating node and who dials an abbreviated number, representing a non-working telephone number of a called party served from a terminating node, to place a call to the called party, said method comprising the steps of:
- at the originating node, retrieving from the calling party's designated portion of the speed calling data base the telephone number of the called party corresponding to the abbreviated number dialed by the calling party;
- tagging the call with a speed calling identification tag;
- routing the call and said identification tag, based upon the retrieved telephone number, to the terminating node serving the called party;
- at the terminating node, upon identifying said retrieved telephone number as non-working and for a speed calling call, querying a rolling data base for an updated telephone number;
- if said updated telephone number is available, retrieving and passing said updated telephone number to the terminating node;
- passing from the terminating node to the originating node a message comprising said updated telephone number of the called party; and
- updating the speed calling data base using information in said message passed from the terminating node.

5. The method of automatically updating a speed calling data base of claim 4, further comprising the steps of:
- informing the calling party of the called party's updated number and that the called party's number has been updated in the speed calling data base, and
- querying the calling party on whether the call should be placed to the updated number.

6. The method of automatically updating a speed calling data base of claim 4, further comprising the step of prior to updating the speed calling data base, querying the calling party on whether to update the speed calling data base.

7. The method of automatically updating a speed calling data base of claim 4, wherein said updating step comprises updating all occurrences of the non-working telephone number appearing in the speed calling database, including portions of the speed calling data base designated to other calling parties.

8. The method of automatically updating a speed calling data base of claim 7, wherein said updating step comprises flagging all occurrences of the updated telephone number appearing in the portions of the speed calling data base designated to calling parties such that, upon one of said occurrences of the updated telephone number being invoked by one of the calling parties, said one of the calling parties is notified that the data base update has occurred.

9. The method of automatically updating a speed calling data base of claim 4, wherein said updating step comprises updating all occurrences of the non-working telephone number appearing in the speed calling data base except where speed calling automatic update has been blocked.

10. The method of automatically updating a speed calling data base of claim 4, wherein said updating step comprises updating only the calling party's designated portion of the speed calling data base using said message from the terminating node.

11. The method of automatically updating a speed calling data base of claim 4, further comprising the step of, if said updated telephone number is unavailable, tagging the non-working number in the speed calling data base as being non-working.

12. A method for updating information in a first data base of a telephone network, using information retrieved from a second data base within the telephone network, said method comprising the steps of:
- routing a first message during call set-up from an originating node based upon information accessed from the first data base to a terminating node,
- at said terminating node, identifying information accessed from the first data base as outdated and retrieving from the second data base updated information,
- passing from said terminating node to said originating node a second message comprising updated information, and
- updating outdated information at the first data base using updated information in said second message passed from said terminating node.

* * * * *